United States Patent
Qiu

(10) Patent No.: US 12,468,630 B2
(45) Date of Patent: Nov. 11, 2025

(54) METHOD TO IMPLEMENT SET-ASSOCIATIVE CACHE CONTROLLER

(71) Applicant: Advanced Micro Devices, Inc., Santa Clara, CA (US)

(72) Inventor: QiuPing Qiu, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/393,650

(22) Filed: Dec. 21, 2023

(65) Prior Publication Data

US 2025/0209004 A1  Jun. 26, 2025

(51) Int. Cl.
| | |
|---|---|
| *G06F 12/0855* | (2016.01) |
| *G06F 12/0864* | (2016.01) |
| *G06F 12/0895* | (2016.01) |
| *G06F 12/126* | (2016.01) |

(52) U.S. Cl.
CPC ...... *G06F 12/0855* (2013.01); *G06F 12/0864* (2013.01); *G06F 12/0895* (2013.01); *G06F 12/126* (2013.01)

(58) Field of Classification Search
None
See application file for complete search history.

(56) References Cited

U.S. PATENT DOCUMENTS

| | | |
|---|---|---|
| 5,353,424 A | 10/1994 | Partovi et al. |
| 5,893,146 A | 4/1999 | Pickett |
| 6,898,671 B2 | 5/2005 | Ito et al. |
| 8,051,337 B2 | 11/2011 | Chen |
| 10,019,370 B2 | 7/2018 | Abali et al. |
| 11,914,521 B1 * | 2/2024 | Klingauf ............. G06F 12/0873 |

* cited by examiner

*Primary Examiner* — Charles J Choi
(74) *Attorney, Agent, or Firm* — Kowert, Hood, Munyon, Rankin & Goetzel, P.C.; Rory D. Rankin

(57) ABSTRACT

An apparatus and method for efficiently processing cache accesses of an integrated circuit. In various implementations, a computing system includes a cache with a tag array, a cache controller, and a data array. The cache controller includes a cache set status array. The cache set status array stores data using any of a variety of flip-flop circuits, which reduces access times and power consumption compared to random access memory (RAM) cells. In each pipeline stage prior to updating the cache set status array, the cache controller conditionally updates cache set status values based on comparisons between a selected set of the memory access request with a set of a previous memory access request that has not yet updated the status array. Updates of cache status values based on the tag comparison occur in the second pipeline stage, which allows reduction of the clock cycle.

20 Claims, 7 Drawing Sheets

METHOD TO IMPLEMENT SET-ASSOCIATIVE CACHE CONTROLLER

BACKGROUND

Description of the Relevant Art

Highly parallel data applications are used in a variety of fields such as science, entertainment, finance, medical, engineering, social media, and so on. These applications process large amounts of data by performing complex calculations at substantially high speeds. Processing circuits include one or more processor cores or other partitions with each partition executing instructions of the applications and generating memory access requests. These partitions are typically pipelined where the partitions include one or more data processing pipeline stages (or stages) connected in series with storage elements (e.g., registers and arrays) placed between the stages. The output of one stage is made the input of the next stage during a transition of a clock signal that defines a clock cycle or a phase, which can be a fraction of a clock cycle. With an increased number of processing circuits in computing systems, the latency to deliver data to the processing circuits becomes emphasized. The performance, such as throughput, of the processing circuits depends on quick access to stored data.

Ideally, every clock cycle produces useful execution of an instruction for each stage of a pipeline. However, a stall in a pipeline causes no useful work to be performed during that particular pipeline stage. Some stalls last several clock cycles and significantly decrease processor performance. Some examples of a stall include a data cache miss and or an instruction cache miss. In an effort to increase performance, cache sizes increase while the operating clock frequency also increases, which decreases the clock cycle and the amount of data processing that can be done within a pipeline stage. Therefore, steps performed by the cache controller can become the bottleneck preventing achieving a desired throughput.

In view of the above, efficient methods and mechanisms for efficiently processing cache accesses of an integrated circuit are desired.

Figure 1:
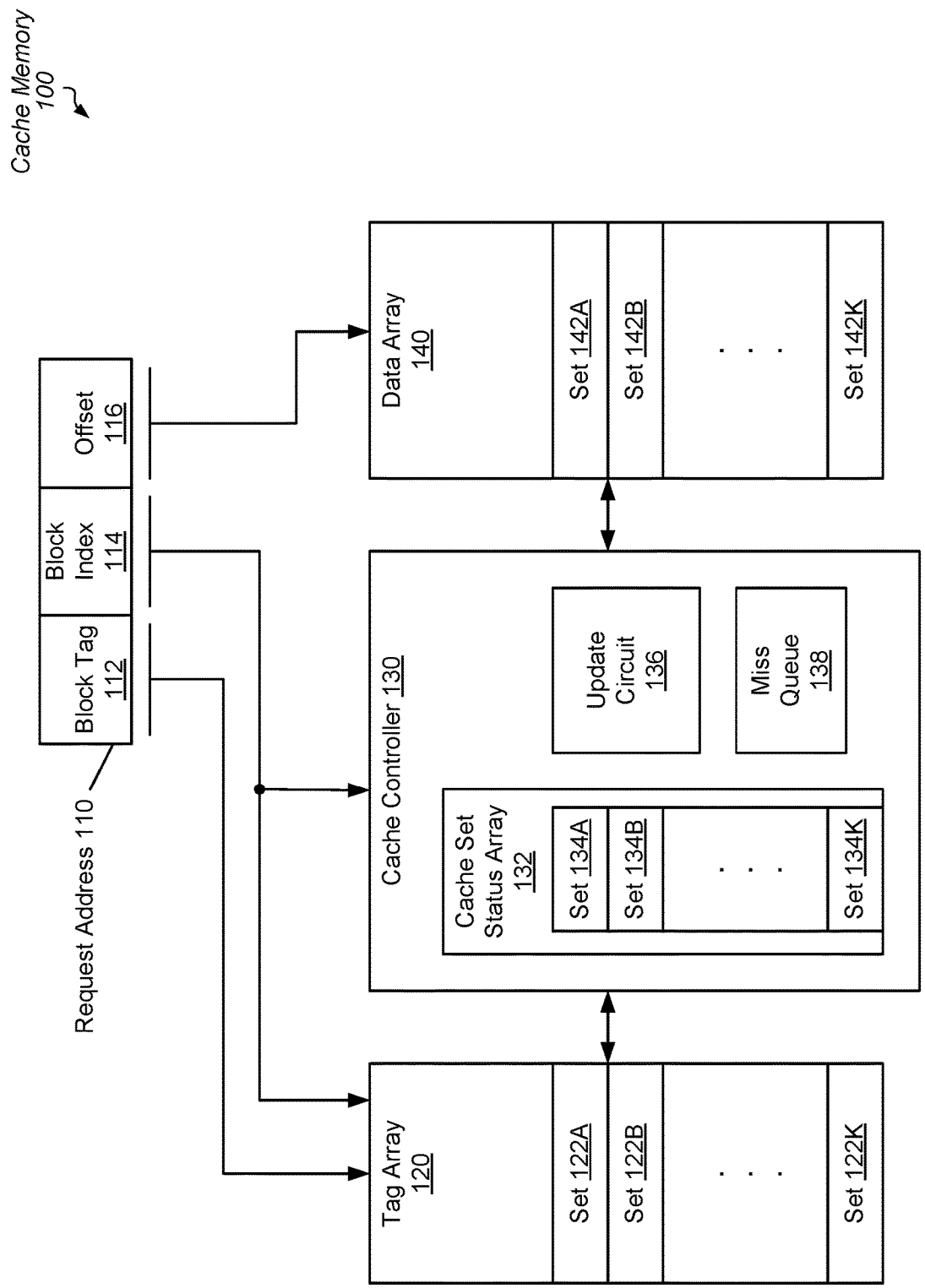
FIG. 1 is a generalized block diagram of a cache memory that efficiently processes cache accesses.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods that efficiently process cache accesses of an integrated circuit are contemplated. In various implementations, a computing system includes a cache with a tag array, a cache controller, and a data array. The cache controller includes a cache set status array. The tag array and the data array include memory bit cells that store data using one of a variety of random-access memory (RAM) cells. In contrast, the cache set status array stores data using any of a variety of flip-flop circuits. Therefore, access times and power consumption of the cache set status array is less than each of the tag array and the data array. Using the block index of a request address, the cache controller selects a set of multiple sets of each of the tag array, the cache set status array, and the data array.

The cache controller includes a multi-stage pipeline for updating cache set status information. The cache controller performs a tag comparison in the same pipeline stage as reading out cache status information for the same memory access request. In each pipeline stage prior to updating the cache set status array based on processing the first memory access request, the cache controller compares the selected set with a set of a previous memory access request that has not yet updated the status array. Based on the comparison results, the cache controller maintains or replaces one or more status values of the first memory access request with status values of the respective previous memory access request. Therefore, consecutive memory access requests targeting the same cache set do not cause any pipeline stalls. Updates of cache status values based on the tag comparison occur in the second pipeline stage, which allows reduction of the clock cycle. Further details of these techniques to efficiently schedule kernels for execution on an integrated circuit are provided in the following description of FIGS. 1-7.

Referring to FIG. 1, a generalized block diagram is shown of a cache memory 100 that efficiently processes cache accesses. In the illustrated implementation, cache memory 100 includes tag array 120, cache controller 130 and data array 140. Data array 140 stores a variety of types of data such as source data, result data, and destination data used by and generated by one or more software applications. Data array 140 can also store instructions of one or more software applications. Therefore, cache memory 100 can be used in a data cache or an instruction cache. The size, associativity, and other storage arrangement details of data array 140 are chosen to provide the best tradeoff between performance and power consumption for applications that run on a target architecture of a semiconductor chip that utilizes cache memory 100.

In an implementation, cache memory 100 can be integrated within a processor core of a general-purpose processing circuit, within a compute circuit of a parallel data processing circuit, or within another partition of another type of processing circuit. Alternatively, cache memory 100 can be coupled to a core or other partition in a backside cache configuration or an inline configuration, as desired. In some implementations, cache memory 100 is a dedicated level one (L1) cache of multiple levels of a cache memory subsystem. In another implementation, cache memory 100 is shared by multiple sources and used as a shared L3 cache structure. Other uses are possible and contemplated.

Cache memory 100 stores multiple cache lines. The term "cache line" can also be referred to as a "cache block." A cache line is a copy of data stored in a storage location of system memory pointed to by a corresponding address. As used herein, a "cache line," a "cache block," or a "block" is a set of bytes stored in contiguous memory locations, which are treated as a unit for coherency purposes. In some implementations, a cache line is also the unit of allocation and deallocation in cache memory 100. The number of bytes in a cache line varies according to design choice and can be of any size. As an example, 32-byte and 64-byte cache lines are often used. As used herein, the terms "set" and "cache set" refer to a subdivision of multiple same-sized subdivisions of a cache with each subdivision storing a same number of cache lines. The number of cache lines stored in the subdivision (cache set) is greater than one and defines the "associativity" of the cache. A 4-way set-associative cache includes 4 cache lines in each of its cache sets. As used herein, a "block index" of a request address refers to a subset of contiguous bits in the request address that points to a particular cache set of the multiple cache sets of the cache.

In some implementations, cache memory 100 is organized as multiple memory banks, and each of the tag array 120, cache controller 130, and data array 140 is segmented into a number of memory banks based on design requirements. It is noted that cache memory 100 includes multiple other blocks that are not shown for ease of illustration. For example, in various implementations, cache memory 100 includes one or more of row decoders, bank address decoders for selecting a memory bank to access when banks are used, pre-charging circuitry and sense amplifiers within one or more the tag array 120 and data array 140, read and write timing control circuitry, and read response data latches and write request data latches.

In various implementations, tag array 120 stores tag portions of addresses that point to storage locations in system memory. As shown, cache memory 100 can receive a request address 110 for either a memory read access request, a memory write access request, or a cache snoop request. Cache memory 100 can receive request address 110 from a variety of sources such as a processing circuit or a cache controller of another cache memory. Request address 110 includes a block tag 112, a block index 114, and an offset 116. Cache controller 130 uses block index 114 to select one of the sets 122A-122K of tag array 120. In a similar manner, cache controller 130 uses block index 114 to select one of the sets 134A-134K of cache set status array 132 and one of the sets 142A-142K of data array 140. In various implementations, each of tag array 120, cache set status array 132, and data array 140 has a same number of sets, and a particular cache set corresponds to one set of the sets 122A-122K of tag array 120, one set of the sets 134A-134K of cache set status array 132, and one set of the sets 142A-142K of data array 140.

In various implementations, data array 140 stores data based on a set associativity. For example, in an implementation, data array 140 uses an 8-way set associativity where each of the sets 142A-142K includes circuitry for storing 8 cache lines. The number of the sets 142A-142K is based on the supported set associativity and the total cache size of cache memory 100. Each of tag array 120 and cache set status array 132 uses the same set associativity as data array 140. Therefore, the number of the sets 122A-122K of tag array 120 and the number of sets 134A-134K of cache set status array 132 is the same as the number of sets 142A-142K of data array 140. Each cache line of tag array 120 and data array 140 includes multiple memory bit cells. The number of memory bit cells used in each cache line of tag array 120 is based on the size of the tag portions of addresses such as request address 110. The number of memory bit cells used in each cache line of data array 140 is based on the size of the data being stored in cache lines. As described earlier, 32-byte and 64-byte cache lines are often used.

In various implementations, data storage in the memory bit cells of tag array 120 and data array 140 uses a variation of the six-transistor (6T) random access memory (RAM) cell such as a static random-access memory (SRAM) cell. In other implementations, another one of various types of RAM cells is used. In some implementations, the devices (or transistors) in cache memory 100 are planar devices. In other implementations, the devices (or transistors) in cache memory 100 are non-planar devices. Examples of non-planar transistors are tri-gate transistors, fin field effect transistors (FETs), and gate all around (GAA) transistors. As used herein, a "transistor" is also referred to as a "semiconductor device" or a "device."

In various implementations, data storage in each set of sets 134A-134K of cache set status array 132 uses one of a variety of flip-flop circuits. Data storage in each set of sets 134A-134K of cache set status array 132 does not use memory bit cells such as RAM cells. Therefore, access times and power consumption of cache set status array 132 is less than each of tag array 120 and data array 140. When an 8-way set associativity is used, the state information of each of the sets 134A-134K includes various types of status data assigned to the eight cache lines of the corresponding set. As used herein, "state information" can also be referred to as "status information, and "cache set status" can also be referred to as "cache set state." An example of the state information (or status information) stored in one of the sets 134A-134K is multiple valid bits with one valid bit for each of the eight cache lines of the set when an 8-way set associativity is used. Another example of the state information stored in one of the sets 134A-134K is eight values of a cache replacement policy with one value for each of the eight cache lines of the set. The cache replacement policy value can be a least-recently-used (LRU) value. Other examples of the cache replacement policy value are possible and contemplated.

Another example of the state information stored in one of the sets 134A-134K is eight values of a pending value that indicates whether the data for the cache line is currently being fetched from a lower level of the cache memory subsystem. The state information stored in one of the sets 134A-134K can also store an in-flight count with one count for each of the eight cache lines of the set when an 8-way set associativity is used. The in-flight count specifies a number of outstanding memory requests waiting for the particular cache fill line to return from a lower level of the cache memory subsystem. It is possible that multiple copies of a cache line are stored in cache memory 100 and one or more other caches (not shown). One of the cached copies can be modified with respect to the other copies in the memory subsystem. Therefore, an update to a cache line is reflected by other copies of the cache line according to a coherency protocol. Various specific coherency protocols are well known.

Cache controller 130 and an external memory controller can include cache coherency circuitry to support the cache coherency protocol. For example, update circuit 136 can include cache coherency circuitry. Therefore, another example of the state information stored in one of the sets 134A-134K for each of the corresponding eight cache lines is a corresponding coherency value. Other examples of the state information stored in one of the sets 134A-134K for each of the corresponding eight cache lines are an application identifier (ID), a process ID, a virtual memory identifier (VMID), a priority level, and so forth. When another set associativity is used, the state information stored in one of the sets 134A-134K includes corresponding values for another number of cache lines.

During a memory access operation for a first memory access request, after one of the sets 122A-122K of tag array 120 is selected based on block index 114, block tag 112 is compared with the eight tag portions stored in the selected set when an 8-way set associativity is used. In other implementations, block tag 112 is compared with another number of tag portions based on the set associativity of cache memory 100. During the tag comparisons, update circuit 136 selects one of the sets 134A-134K of cache set status array 132 using block index 114, and update circuit 136 reads out the corresponding status information. In various implementations, the steps of the tag comparisons performed with tag array 120 and the steps of reading out state information from cache set status array 132 occur in the same pipeline stage (or the same clock cycle). In this pipeline stage, update circuit 136 compares the selected first set identifier (ID) of the first memory access request with a second set ID of an older memory access request. This older memory access request is a memory access request that was issued earlier clock cycle than the first memory access request and has not yet updated the cache set status array 132.

Following the above comparison of set IDs, when the set IDs match, the update circuit 136 replaces one or more status values of the selected first set of sets 134A-134K with status values of the previous (older) memory access request. However, update circuit 136 does not update one or more status values of the selected first set (corresponding to the first memory access request) based on the tag comparison for the first memory access request. Rather, these updates occur in a subsequent pipeline stage (subsequent clock cycle). Therefore, the clock cycle can reduce. For example, updates for at least the cache replacement policy (e.g., LRU value or other), pending status, and in-flight count occur in the subsequent pipeline stage (subsequent clock cycle).

In some implementations, update circuit 136 has a latency of N clock cycles where N is a positive, non-zero integer. In other words, update circuit 136 has N pipeline stages between the issuing of a memory access request and the storing of status information in the cache set status array 132 for the memory access request. In an example, cache memory 100 has 64 cache sets, each with 8 cache lines. Therefore, in this example, cache memory 100 has 512 cache lines and uses 8-way set associativity. In the first clock cycle (pipeline stage), for the first memory access request, the steps of the tag comparisons performed with tag array 120 and the steps of reading out state information from the selected first set of sets 134A-134K both occur as described earlier. In this first clock cycle, when the set IDs match, the update circuit 136 replaces one or more status values of the selected first set of sets 134A-134K with status values of the previous (older) memory access request that issued N–M clock cycles earlier. Here, M is a positive, non-zero integer that begins with one and increments for each subsequent pipeline stage. Therefore, in the first pipeline stage, the quantity (N–M) is equal to (N–1). For a 3-stage pipeline, N is equal to 3, and the quantity (N–1) is equal to 2. Accordingly, in the first pipeline stage of update circuit 136, update circuit 136 compares the set ID of the first memory access request to the set ID of the previous (older) memory access request that was issued 2 clock cycles earlier.

The previous memory access request that issued 2 clock cycles earlier has not yet stored status information in the first set of sets 134A-134K. However, this previous memory access request has more recent status information for the first set. For example, the first set can be set 20 of the 64 cache sets and the first memory access request can target cache line 4 of the 8 cache lines in cache set 20. The previous memory access request that issued 2 clock cycles earlier can target cache line 7 of the 8 cache lines in cache set 20. At the end of the pipeline, updates of set 20 of the 64 sets of sets 134A-134K occurs as well as an output to other control circuitry of update logic 136 is sent. This other control circuitry accesses the miss queue 138, if needed, selects which cache line to evict, if needed, and so forth. To provide the most recent status information to the other control circuitry without waiting for each previous memory access request targeting the same set of sets 134A-134K to complete, update circuit 136 performs the comparisons of set IDs and updates one or more status values when the set IDs match.

In the subsequent clock cycle (subsequent pipeline stage), the integer M is incremented from 1 to 2, and the entity (N–M) is equant to (3–2), or 1. Accordingly, in the second pipeline stage of update circuit 136, update circuit 136 compares the set ID of the first memory access request to the set ID of the previous (older) memory access request that issued 1 clock cycle earlier. The previous memory access request that issued 1 clock cycle earlier has not yet stored status information in the first set of sets 134A-134K. However, this previous memory access request has more recent status information for the first set. In this subsequent clock cycle, the result of the tag comparison operation is also known. The result is added to the status information of the first set of the first memory access request. If the result is a hit, which means a match was found in the selected first set for the block tag 112, then an indication of the cache hit is used to access the corresponding cache line stored in data array 140. Additionally, cache controller 130 uses block offset 116 of request address 110 to access a particular byte or word within the targeted cache line. If, however, the result is a miss, which means no match was found in the selected first set for the block tag 112, then an entry is allocated in miss queue 138.

Miss queue 138 uses one of a variety of data storage circuits to store target addresses that resulted in a cache miss. Miss queue 138 can use one of a variety of SRAM, flip-flop circuits, a content addressable memory (CAM), or other. Update circuit 136 or control circuitry in miss queue 138 uses the data stored in entries of miss queue 138 to generate miss requests to send to a lower level of a cache memory subsystem. It is noted that in the above examples, update circuit 136 issued one memory access request each clock cycle. However, in other implementations, update circuit 136 issues multiple memory access requests each clock cycle. Update circuit 136 tracks the set IDs of issued memory access requests and the corresponding clock cycle of issue until the issued memory access requests complete updates of status information in the cache set status array 132.

It is also noted that in various implementations, tag comparisons occur only for the selected set of 122A-122K. In an implementation, cache memory 100 has 512 cache lines, 64 cache sets, each with 8 cache lines, and uses 8-way set associativity. Rather than compare the block tag 112 with each of the 512 tag portions stored in sets 122A-122K followed by a series of Boolean OR operations to generate a comparison result, cache memory 100 compares block tag 112 with only 8 tag portions stored in the selected set of sets 122A-122K. Further details of the pipeline stages of update circuit 136 are provided in the description of cache controller 200.

Figure 2:
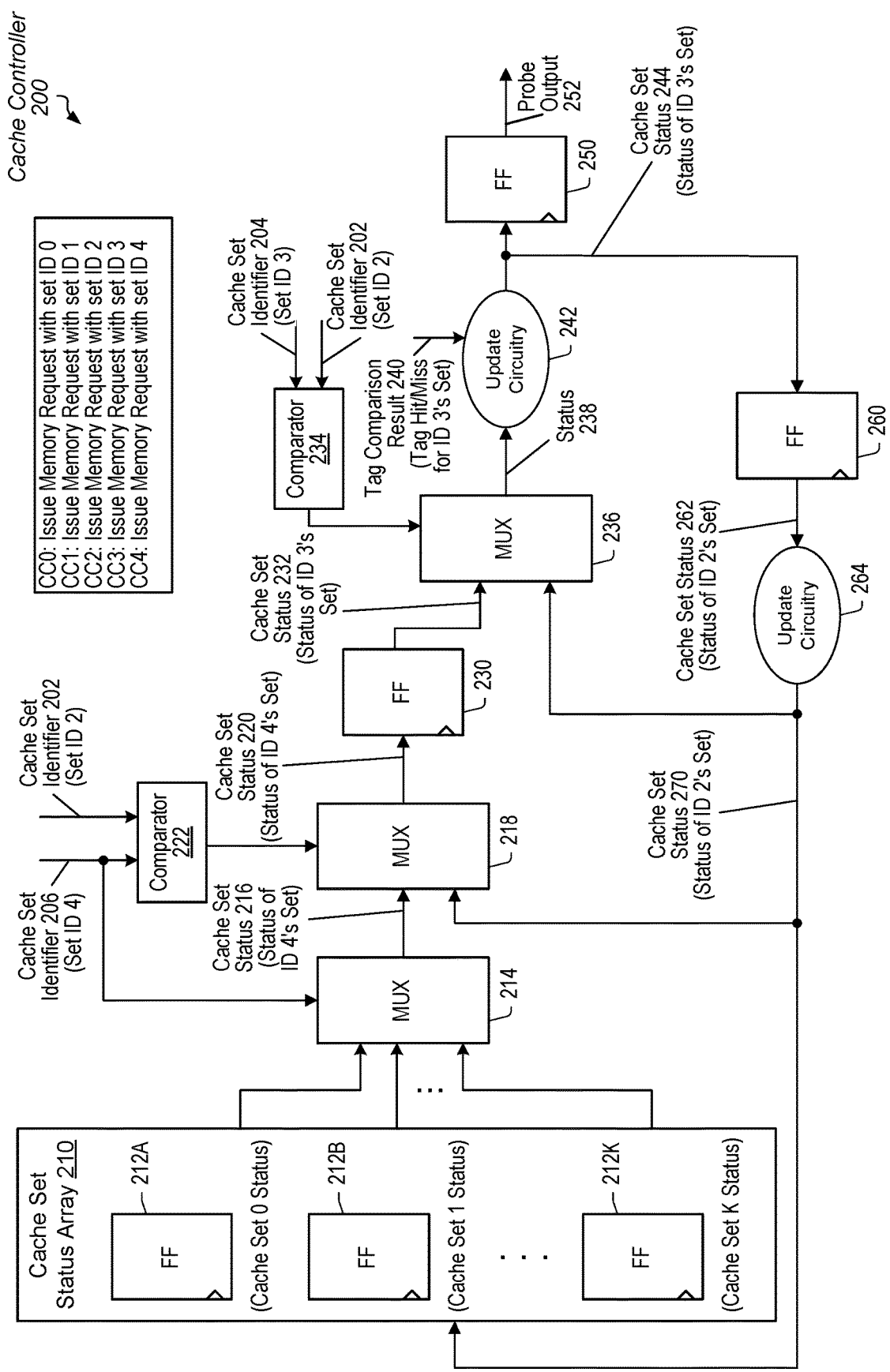
FIG. 2 is a generalized block diagram of a cache controller that efficiently processes cache accesses.

Turning now to FIG. 2, a generalized block diagram is shown of a cache controller 200 that efficiently processes cache accesses. In the illustrated implementation, the cache controller 200 includes cache set status array 210, pipeline registers 230, and pipeline registers 260. Between pipeline registers 230 and cache set status array 210 is a first pipeline stage. Between pipeline registers 230 and cache set status array 210 is a first pipeline stage. Between pipeline registers 230 and cache set status array 260 is a second pipeline stage. Between pipeline registers 260 and cache set status array 210 is a third pipeline stage, which loops back to cache set status array 210. Therefore, cache controller 200 is a three-stage pipeline and has a latency of three clock cycles. In other words, cache controller 200 has 3 pipeline stages between the issuing of a memory access request and the storing of status information in the cache set status array 210 for the memory access request. Although the number, N, of pipeline stages in cache controller 200 is three, in other implementations, N is another number based on design requirements.

In some implementations, cache controller 200 includes the additional pipeline registers 250 to send status information to other control circuitry and a miss queue. For example, pipeline registers 250 send the probe output 252 to external control circuitry. In other implementations, pipeline registers 260 sends status information to both cache set status array 210 and the external control circuitry. Update circuitry 264 updates one or more status values prior to data storage in one of the sets 212A-212K of cache set status array 210. In various implementations, pipeline registers 230, 250 and 260 are implemented with one of a variety of flip-flop circuits. Although a single flip-flop circuit is shown for each of pipeline registers 230, 250 and 260, these pipeline registers include any number of flip-flop circuits based on design requirements that determine the amount of cache set status information to store. Similarly, cache set status array 210 uses flip-flop circuits to store cache set status information, rather than using memory bit cells such as RAM cells. Therefore, access times and power consumption of cache set status array 210 is less than each of an external tag array and an external data array.

Each of the sets 212A-212K of cache set status array 210 stores status information of a corresponding cache set. When a corresponding cache memory uses an 8-way set associativity, the state information of each of the sets 212A-212K includes various types of status data assigned to the eight cache lines of the corresponding set. In various implementations, cache set status array 210 has the functionality of cache set status array 132 (of FIG. 1). Therefore, cache set status array 210 stores one or more of the examples of cache state information described earlier. As shown, prior to updating cache set status array 210 with new cache set state information, each of the pipeline stages of cache controller 200 compares cache set identifiers (or set IDs). Comparator 222 and multiplexer (MUX) 218 compare set IDs in the first pipeline stage. Multiplexer (MUX) 214 selects one of the sets 212A-212K in the first pipeline stage prior to the comparison of the set IDs. Comparator 234 and multiplexer (MUX) 236 compare set IDs in the second pipeline stage.

To reduce the duration of the clock cycle of the pipeline stages, the tag comparison result is not used until the second pipeline stage. In the second pipeline stage, update circuitry 242 receives the tag comparison result 240. A further description of the details of cache controller 200 is provided in the following description of cache controller 300, which includes the components of cache controller 200 with further annotation. The further annotation was not used in cache controller 200 for ease of illustration. For the example used to demonstrate the functionality of cache controller 200 (and cache controller 300), a memory access request is issued in each of clock cycles (CCs) 0 to 4. Each of these memory access requests targets a corresponding cache set identifier (set ID). In CC 0, the first memory access request targets set ID 0, which points to one of the sets 212A-212K. In CC 1, the second memory access request targets set ID 1, which points to one of the sets 212A-212K. In CC 2, the third memory access request targets set ID 2, which points to one of the sets 212A-212K, and so on. It is noted that in this example, cache controller 200 issues one memory access request each clock cycle. However, in other implementations, cache controller 200 issues multiple memory access requests each clock cycle. cache controller 200 tracks the set IDs of issued memory access requests and the corresponding clock cycle of issue until the issued memory access requests complete updates of status information in the cache set status array 210.

Figure 3:
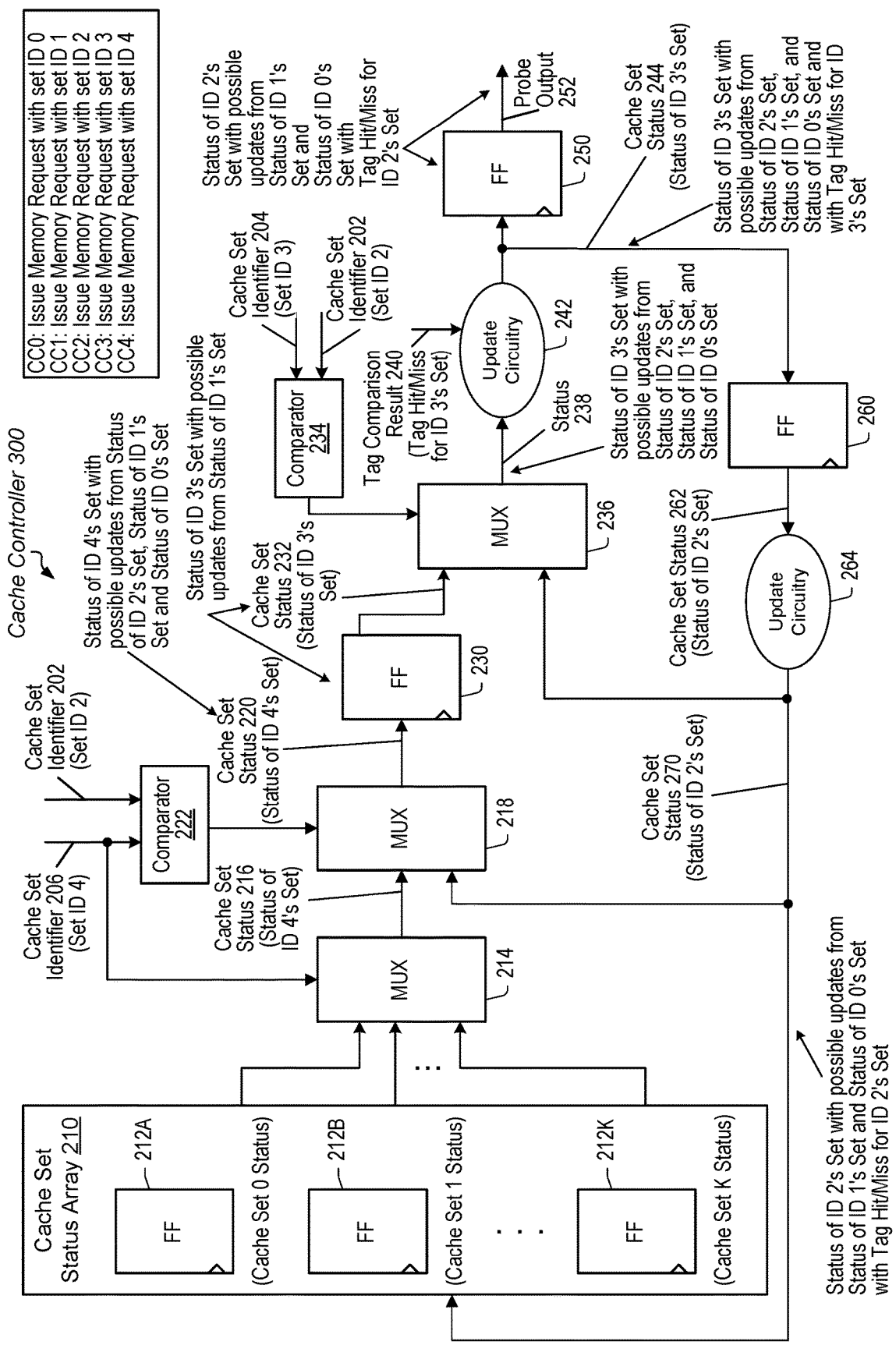
FIG. 3 is a generalized block diagram of a cache controller that efficiently processes cache accesses.

Turning now to FIG. 3, a generalized block diagram is shown of a cache controller 300 that efficiently processes cache accesses. In the illustrated implementation, the cache controller 300 includes the same components as cache controller 200. Circuits and components previously described are numbered identically. Cache controller 200 includes further annotation than cache controller 200. As described earlier, in CC 0, the first memory access request targets set ID 0, which points to one of the sets 212A-212K. In CC 1, the second memory access request targets set ID 1, which points to one of the sets 212A-212K, and so on. In CC 4, multiplexer 214 receives cache set identifier 206, which includes set ID 4. In various implementations, set ID 4 is a block index of a request address of the fifth memory access request. Multiplexer 214 uses cache set identifier 206 to select one of the sets 212A-212K and output the corresponding cache set state information as cache set status 216 (status of ID 4's set). Examples of the status information were provided earlier regarding the state information stored in sets 134A-134K of cache set status array 132 (of FIG. 1).

Multiplexer 218 conditionally updates one or more status values of cache set status 216 (status of ID 4's set) by receiving the output of comparator 222 as a selection control input signal. Comparator 222 compares the cache set identifier 206 and cache set identifier 202. In the illustrated example, cache set identifier 206 is the set ID 4 of the presently issued memory access request (issued in CC 4) and cache set identifier 202 is the set ID 2 of the previously issued memory access request (issued in CC 2). Therefore, in the first pipeline stage of cache controller 300, the set ID of the memory access request having its cache set status information currently being accessed from cache set status array 210 is compared with the set ID of the memory access request issued N-M clock cycles earlier. Here, N is a positive, non-zero integer equal to the number of pipeline stages of cache controller 300 and M is a positive, non-zero integer equal to the current pipeline stage of cache controller 300. In the illustrated example, N is equal to 3, and in the first pipeline stage, M is equal to 1. Therefore, the quantity (N−M) is equal to (3−1), which is 2, and the cache set identifier 206 (set ID 4) of the presently issued memory access request is compared with the cache set identifier 202 (set ID 2) of the memory access request issued 2 clock cycles earlier than the memory access request corresponding to cache set identifier 206 (set ID 4).

When comparator 222 generates a result that indicates the cache set identifier 206 (set ID 4) does not match the cache set identifier 202 (set ID 2), the status values of cache set status 216 (status of ID 4's set) are maintained, rather than updated. However, when comparator 222 generates a result that indicates the cache set identifier 206 (set ID 4) matches the cache set identifier 202 (set ID 2), multiplexer 218 replaces (updates) one or more status values of cache set status 216 (status of ID 4's set). For example, each of the cache set identifier 206 (set ID 4) and the cache set identifier 202 (set ID 2) can specify cache set 20. In such a case, multiplexer 218 replaces (updates) one or more status values of cache set status 216 (status of ID 4's set). Although a single multiplexer is shown, multiplexer 218 includes multiple multiplexers, one multiplexer for each status value that can be replaced (updated) in a cache set. In some implementations, the status values that can be replaced (updated) include the cache replacement policy values of cache lines in the specified cache set, the pending values of cache lines in the specified cache set, the in-flight count values of cache lines in the specified cache set, and the cache coherency values of cache lines in the specified cache set.

To replace (update) one or more cache set status values of cache set status 216 (status of ID 4's set), the other input to multiplexer 218 is cache set status 270 (status of ID 2's set). Cache set status 270 (status of ID 2's set) is the output of the last pipeline stage of cache controller 300, which is used to update cache set status array 210. The output of multiplexer 218 is cache set status 220 (status of ID 4's set). In the illustrated example, cache set status 270 (status of ID 2's set) corresponds with the memory access request issued in CC 2. It is noted that cache set status 270 (status of ID 2's set) can include updated cache set status values from each of the previous memory access requests issued in CC 1 and CC 0. Therefore, the output of multiplexer 218, which is cache set status 220 (status of ID 4's set), also can include updated cache set status values from each of the previous memory access requests issued in CC 1 and CC 0.

Pipeline registers 230 stores cache set status 220 (status of ID 4's set) at the end of the clock cycle. Prior to the end of the clock cycle, pipeline registers 230 store cache set status 232 (status of ID 3's set), which is the status information of the cache set targeted by the memory access request issued in CC 3. Pipeline registers 230 are located at the end of the first pipeline stage and the start of the subsequent second pipeline stage. Comparator 234 compares the cache set identifier 204 (set ID 3) and cache set identifier 202 (set ID 2). In the second pipeline stage of cache controller 300, the set ID of the memory access request that had its cache set status information accessed from cache set status array 210 a clock cycle earlier (memory access request issued in CC 3) is compared with the set ID of the memory access request issued N−M clock cycles earlier. Here, N is equal to the 3 pipeline stages of cache controller 300 and M is equal to the current pipeline stage of cache controller 300, which is 2. Therefore, the quantity (N−M) is equal to (3−2), which is 1, and the cache set identifier 204 (set ID 3) is compared with the cache set identifier 202 (set ID 2) of the memory access request issued 1 clock cycle earlier than the memory access request corresponding to cache set identifier 204 (set ID 3).

When comparator 234 generates a result that indicates the cache set identifier 204 (set ID 3) does not match the cache set identifier 202 (set ID 2), the status values of cache set status 232 (status of ID 3's set) are maintained, rather than updated. However, when comparator 234 generates a result that indicates the cache set identifier 204 (set ID 3) matches the cache set identifier 202 (set ID 2), multiplexer 236 replaces (updates) one or more status values of cache set status 232 (status of ID 3's set) using cache set status 270 (status of ID 2's set). The output of multiplexer 236 is cache set status 238 (status of ID 3's set) that can include one or more status values of cache set status 270 (status of ID 2's set). As described earlier, it is noted that cache set status 270 (status of ID 2's set) can include updated cache set status values from each of the previous memory access requests issued in CC 1 and CC 0. Therefore, the output of multiplexer 236, which is cache set status 238 (status of ID 3's set), also can include updated cache set status values from each of the previous memory access requests issued in CC 1 and CC 0.

Update circuitry 242 adds tag comparison result 240 to cache set status 238 (status of ID 3's set). As described earlier, the tag comparison result is not used in the first pipeline stage so as to allow reduction of the clock cycle. Update circuitry 242 also updates the cache replacement policy status values (e.g., LRU values). Based on the tag comparison result 240, update circuitry 242 also updates the pending status values and in-flight count values of the status values. The output of update circuitry 242 is cache set status 244 (status of ID 3's set) that includes the tag comparison result 240. Pipeline registers 260 stores cache set status 244 (status of ID 3's set) at the end of the clock cycle. Prior to the end of the clock cycle, pipeline registers 260 store cache set status 262 (status of ID 2's set), which is the status information of the cache set targeted by the memory access request issued in CC 2. Pipeline registers 260 are located at the end of the second pipeline stage and the start of the subsequent third pipeline stage. In the third pipeline stage of cache controller 300, cache set status array 210 is updated with status information of the cache set targeted by the memory access request issued in CC 2.

Update circuitry 264 updates one or more status values of cache set status 262 (status of ID 2's set) such as the cache replacement policy status values (e.g., LRU values) and in-flight count values of the status values. The output of update circuitry 264 is cache set status 270 (status of ID 2's set), which is used to update cache set status array 210. Here, N is equal to the 3 pipeline stages of cache controller 300 and M is equal to the current pipeline stage of cache controller 300, which is 3. Therefore, the quantity (N−M) is equal to (3−3), which is 0, and the cache set identifier 204 (set ID 3) is not compared to other cache set identifier in the third pipeline stage.

Figure 4:
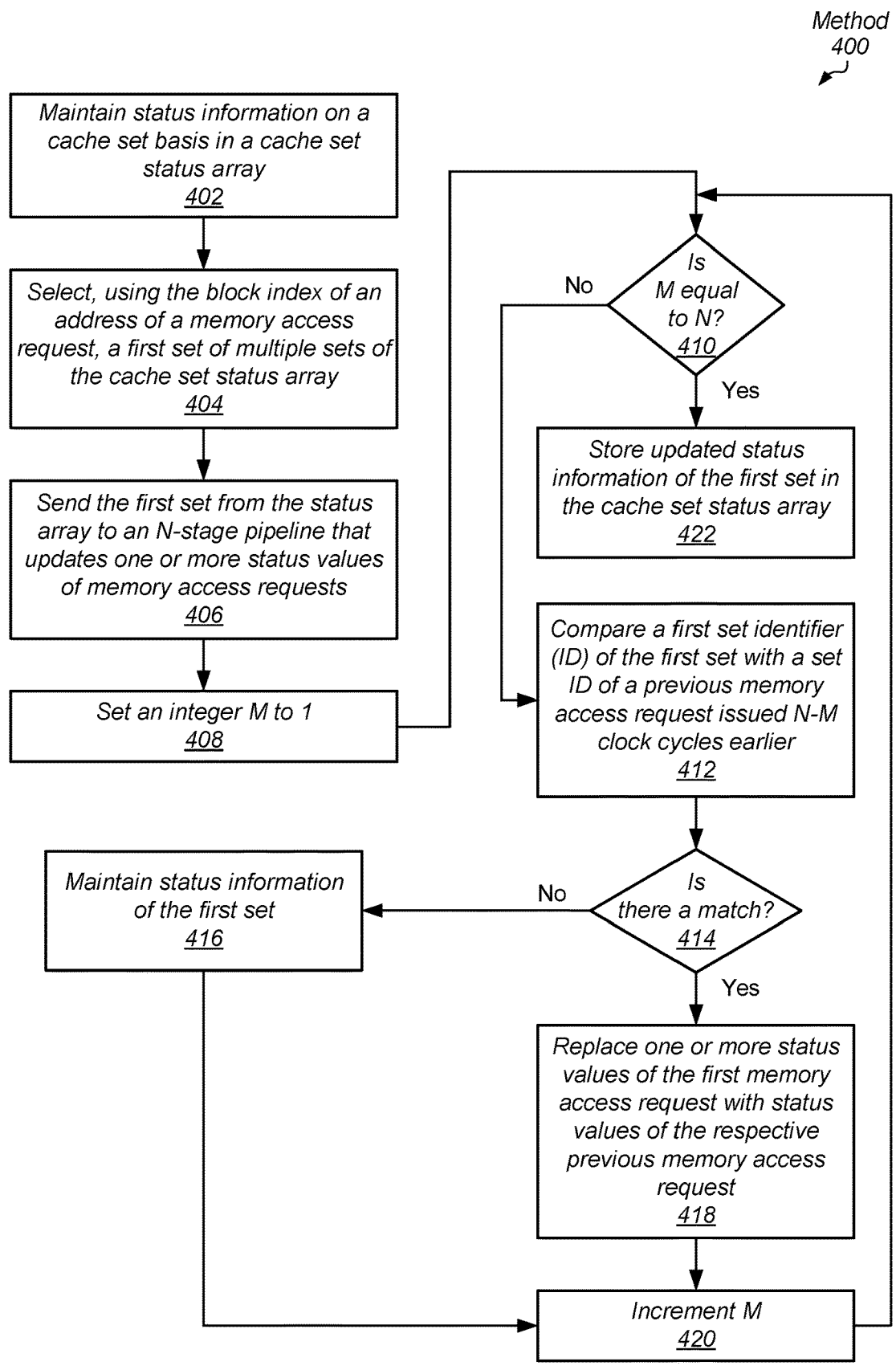
FIG. 4 is a generalized block diagram of a method for efficiently processing cache accesses of an integrated circuit.

Referring to FIG. 4, a generalized block diagram is shown of a method 400 for efficiently processing cache accesses of an integrated circuit. For purposes of discussion, the steps in this implementation (as well as FIG. 7) are shown in sequential order. However, in other implementations some steps occur in a different order than shown, some steps are performed concurrently, some steps are combined with other steps, and some steps are absent.

Circuitry of a cache controller maintains status information on a cache set basis in a cache set status array (block 402). The cache set status array uses flip-flop circuits to store cache set status information, rather than using memory bit cells such as RAM cells. Therefore, access times and power consumption of the cache set status array is less than each of an external tag array and an external data array. An example of the state information (or status information) stored in one of the sets of the cache set status array is multiple valid bits with one valid bit for each of the multiple cache lines of the set. Other examples of status values of the cache lines in the cache set are cache coherency values, cache replacement values, pending values, in-flight count values, an application identifier (ID), a process ID, a virtual memory identifier (VMID), a priority level, and so forth.

The circuitry selects, using the block index of an address of a memory access request, a first set of multiple sets of the status array (block 404). The circuitry sends the first set from the status array to an N-stage pipeline that updates one or more status values of memory access requests (block 406). The circuitry sets an integer M to 1 (block 408). If M does not equal N ("no" branch of the conditional block 410), then the circuitry compares a first set identifier (ID) of the first set with a set ID of a previous memory access request issued N-M clock cycles earlier (block 412). If the result of the comparison indicates that there is not a match between the set IDs ("no" branch of the conditional block 414), then the circuitry maintains the status information of the first set (block 416).

If the result of the comparison indicates that there is a match between the set IDs ("yes" branch of the conditional block 414), then the circuitry replaces one or more status values of the first memory access request with status values of the respective previous memory access request (block 418). This previous memory access request was issued N−M clock cycles earlier. The circuitry increments M (block 420). Afterward, control flow of method 400 returns to conditional block 410 where the circuitry compares N and M. If M equals N ("yes" branch of the conditional block 410), then the circuitry stores updated status information of the first set in the cache set status array (block 422).

Figure 5:
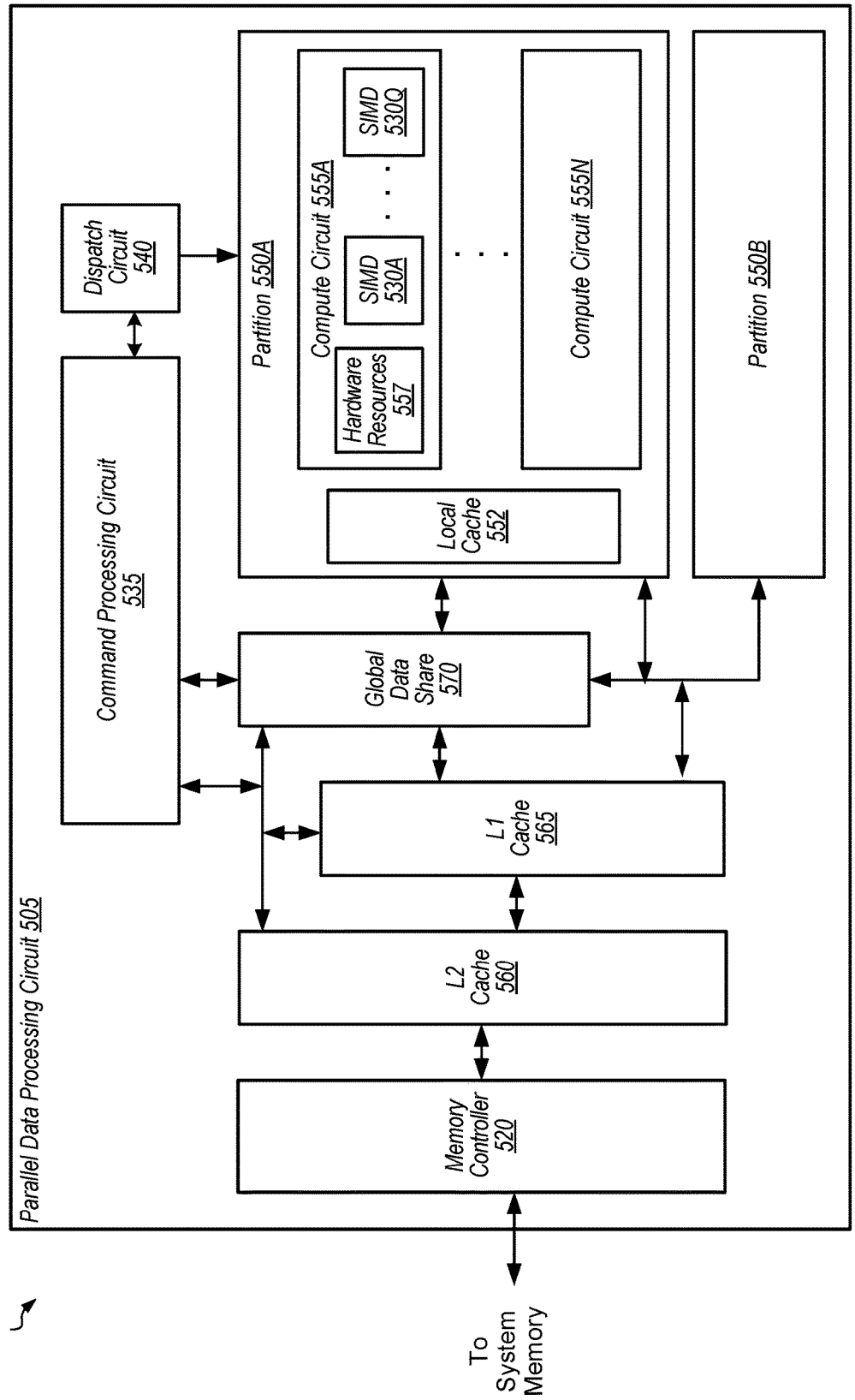
FIG. 5 is a generalized block diagram of an apparatus for efficiently processing cache accesses of an integrated circuit.

Turning now to FIG. 5, a block diagram is shown of an apparatus 500 that efficiently processes cache accesses of an integrated circuit. In one implementation, apparatus 500 includes the parallel data processing circuit 505 with an interface to system memory. In an implementation, the parallel data processing circuit 505 is a graphics processing unit (GPU). In various implementations, apparatus 500 executes any of various types of highly parallel data applications. As part of executing an application, a host CPU (not shown) launches kernels to be executed by the parallel data processing circuit 505. The command processing circuit 535 receives kernels from the host CPU and determines when dispatch circuit 540 dispatches wavefronts of these kernels to the compute circuits 555A-555N.

Multiple processes of a highly parallel data application provide multiple kernels to be executed on the compute circuits 555A-555N. Each kernel corresponds to a function call of the highly parallel data application. The parallel data processing circuit 505 includes at least the command processing circuit (or command processor) 535, dispatch circuit 540, compute circuits 555A-555N, memory controller 520, global data share 570, shared level one (L1) cache 565, and level two (L2) cache 560. It should be understood that the components and connections shown for the parallel data processing circuit 505 are merely representative of one type processing circuit and does not preclude the use of other types of processing circuits for implementing the techniques presented herein. The apparatus 500 also includes other components which are not shown to avoid obscuring the figure. In other implementations, the parallel data processing circuit 505 includes other components, omits one or more of the illustrated components, has multiple instances of a component even if only one instance is shown in the apparatus 500, and/or is organized in other suitable manners. Also, each connection shown in the apparatus 500 is representative of any number of connections between components. Additionally, other connections can exist between components even if these connections are not explicitly shown in apparatus 500.

In an implementation, the memory controller 520 directly communicates with each of the partitions 550A-550B and includes circuitry for supporting communication protocols and queues for storing requests and responses. Threads within wavefronts executing on compute circuits 555A-555N read data from and write data to the cache 552, vector general-purpose registers, scalar general-purpose registers, and when present, the global data share 570, the shared L1 cache 565, and the L2 cache 560. When present, it is noted that L1 cache 565 can include separate structures for data and instruction caches. It is also noted that global data share 570, shared L1 cache 565, L2 cache 560, memory controller 520, system memory, and cache 552 can collectively be referred to herein as a "cache memory subsystem". In various implementations, one or more of shared L1 cache 565, L2 cache 560, local cache 552, and caches within compute circuits 555A-555N include the functionality of cache memory 100 (of FIG. 1) and cache controllers 200-300 (of FIGS. 2-3).

In various implementations, the circuitry of partition 550B is a replicated instantiation of the circuitry of partition 550A. In some implementations, each of the partitions 550A-550B is a chiplet. As used herein, a "chiplet" is also referred to as an "intellectual property block" (or IP block). However, a "chiplet" is a semiconductor die (or die) fabricated separately from other dies, and then interconnected with these other dies in a single integrated circuit in the MCM. On a single silicon wafer, only multiple chiplets are fabricated as multiple instantiated copies of particular integrated circuitry, rather than fabricated with other functional blocks that do not use an instantiated copy of the particular integrated circuitry. For example, the chiplets are not fabricated on a silicon wafer with various other functional blocks and processors on a larger semiconductor die such as an SoC. A first silicon wafer (or first wafer) is fabricated with multiple instantiated copies of integrated circuitry a first chiplet, and this first wafer is diced using laser cutting techniques to separate the multiple copies of the first chiplet. A second silicon wafer (or second wafer) is fabricated with multiple instantiated copies of integrated circuitry of a second chiplet, and this second wafer is diced using laser cutting techniques to separate the multiple copies of the second chiplet.

In an implementation, the local cache 552 represents a last level shared cache structure such as a local level-two (L2) cache within partition 550A. Additionally, each of the multiple compute circuits 555A-555N includes SIMD circuits 530A-530Q, each with circuitry of multiple parallel computational lanes of simultaneous execution. These parallel computational lanes operate in lockstep. In various implementations, the data flow within each of the lanes is pipelined. Pipeline registers are used for storing intermediate results and circuitry for arithmetic logic units (ALUs) perform integer arithmetic, floating-point arithmetic, Boolean logic operations, branch condition comparisons and so forth. These components are not shown for ease of illustration. Each of the ALUs within a given row across the lanes includes the same circuitry and functionality, and operates on the same instruction, but different data, such as a different data item, associated with a different thread.

In addition to the SIMD circuits 530A-530Q, the compute circuit 555A also includes the hardware resources 557. The hardware resources 557 include at least an assigned number of vector general-purpose registers (VGPRs) per thread, an assigned number of scalar general-purpose registers (SGPRs) per wavefront, and an assigned data storage space of a local data store per workgroup. Each of the compute circuits 555A-555N receives wavefronts from the dispatch circuit 540 and stores the received wavefronts in a corresponding local dispatch circuit (not shown). A local scheduler within the compute circuits 555A-555N schedules these wavefronts to be dispatched from the local dispatch circuits to the SIMD circuits 530A-530Q. The cache 552 can be a last level shared cache structure of the partition 550A.

Figure 6:
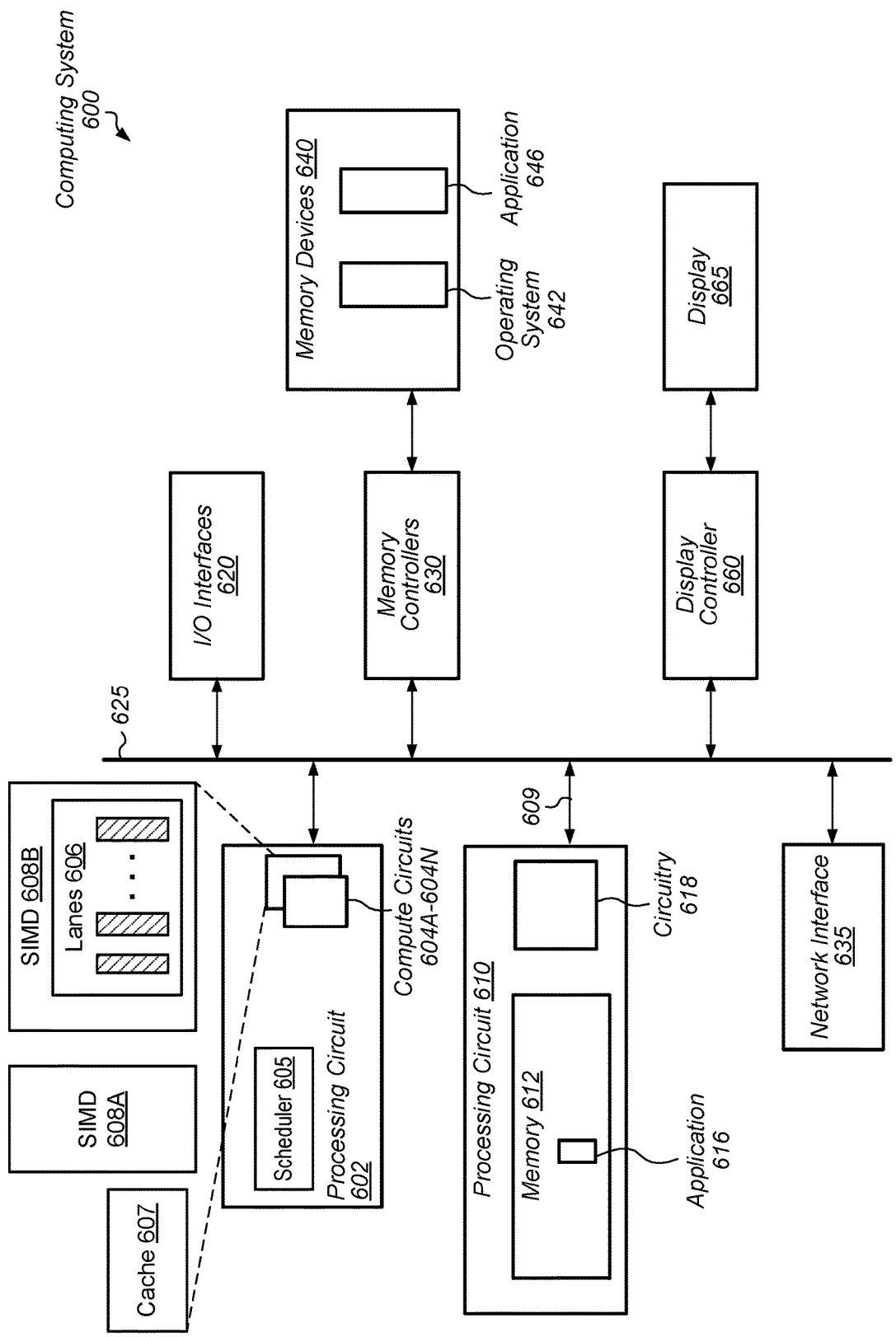
FIG. 6 is a generalized block diagram of a computing system that efficiently processes cache accesses of an integrated circuit.

Turning now to FIG. 6, a generalized diagram is shown of a computing system 600 that efficiently processes cache accesses of an integrated circuit. In an implementation, the computing system 600 includes at least processing circuits 602 and 610, input/output (I/O) interfaces 620, bus 625, network interface 635, memory controllers 630, memory devices 640, display controller 660, and display 665. In other implementations, computing system 600 includes other components and/or computing system 600 is arranged differently. For example, power management circuitry, and phased locked loops (PLLs) or other clock generating circuitry are not shown for ease of illustration. In various implementations, the components of the computing system 600 are on the same die such as a system-on-a-chip (SOC). In other implementations, the components are individual dies in a system-in-package (SiP) or a multi-chip module (MCM). A variety of computing devices use the computing system 600 such as a desktop computer, a laptop computer, a server computer, a tablet computer, a smartphone, a gaming device, a smartwatch, and so on.

Processing circuits 602 and 610 are representative of any number of processing circuits which are included in computing system 600. In an implementation, processing circuit 610 is a general-purpose central processing unit (CPU). In one implementation, the processing circuit 602 is a parallel data processing circuit with a highly parallel data microarchitecture, such as a GPU. The processing circuit 602 can be a discrete device, such as a dedicated GPU (dGPU), or the processing circuit 602 can be integrated (an iGPU) in the same package as another processing circuit. Other parallel data processing circuits that can be included in computing system 600 include digital signal processing circuits (DSPs), field programmable gate arrays (FPGAs), application specific integrated circuits (ASICs), and so forth.

In various implementations, the processing circuit 602 includes multiple, replicated compute circuits 604A-604N, each including similar circuitry and components such as the SIMD circuits 608A-608B, the cache 607, and hardware resources (not shown). The SIMD circuit 608A includes replicated circuitry of the circuitry of the SIMD circuit 608A. Although two SIMD circuits are shown, in other implementations, another number of SIMD circuits is used based on design requirements. As shown, the SIMD circuit 608B includes multiple, parallel computational lanes 606. Cache 607 can be used as a shared last-level cache in a compute circuit similar to local cache 552 (of FIG. 5). In various implementations, one or more of cache 607 and other caches used within processing circuit 602 include the functionality of cache memory 100 (of FIG. 1) and cache controllers 200-300 (of FIGS. 2-3).

The hardware of scheduler 605 assigns wavefronts to be dispatched to the compute circuits 604A-604N. In an implementation, scheduler 605 is a command processing circuit of a GPU. In some implementations, the application 646 stored on the memory devices 640 and its copy (application 616) stored on the memory 612 are a highly parallel data application that includes particular function calls using an API to allow the developer to insert a request in the highly parallel data application for launching wavefronts of a kernel (function call). In an implementation, this kernel launch request is a C++ object, and it is converted by circuitry 618 of the processing circuit 610 to a command.

In some implementations, application 646 is a highly parallel data application that provides multiple kernels to be executed on the compute circuits 604A-604N. The high parallelism offered by the hardware of the compute circuits 604A-604N is used for real-time data processing. Examples of real-time data processing are rendering multiple pixels, image blending, pixel shading, vertex shading, and geometry shading. In such cases, each of the data items of a wavefront is a pixel of an image. The compute circuits 604A-604N can also be used to execute other threads that require operating simultaneously with a relatively high number of different data elements (or data items). Examples of these threads are threads for scientific, medical, finance and encryption/decryption computations.

Memory 612 represents a local hierarchical cache memory subsystem. Memory 612 stores source data, intermediate results data, results data, and copies of data and instructions stored in memory devices 640. Processing circuit 610 is coupled to bus 625 via interface 609. Processing circuit 610 receives, via interface 609, copies of various data and instructions, such as the operating system 642, one or more device drivers, one or more applications such as application 646, and/or other data and instructions. The processing circuit 610 retrieves a copy of the application 644 from the memory devices 640, and the processing circuit 610 stores this copy as application 616 in memory 612.

In some implementations, computing system 600 utilizes a communication fabric ("fabric"), rather than the bus 625, for transferring requests, responses, and messages between the processing circuits 602 and 610, the I/O interfaces 620, the memory controllers 630, the network interface 635, and the display controller 650. When messages include requests for obtaining targeted data, the circuitry of interfaces within the components of computing system 600 translates target addresses of requested data. In some implementations, the bus 625, or a fabric, includes circuitry for supporting communication, data transmission, network protocols, address formats, interface signals and synchronous/asynchronous clock domain usage for routing data.

Memory controllers 630 are representative of any number and type of memory controllers accessible by processing circuits 602 and 610. While memory controllers 630 are shown as being separate from processing circuits 602 and 610, it should be understood that this merely represents one possible implementation. In other implementations, one of memory controllers 630 is embedded within one or more of processing circuits 602 and 610 or it is located on the same semiconductor die as one or more of processing circuits 602 and 610. Memory controllers 630 are coupled to any number and type of memory devices 640.

Memory devices 640 are representative of any number and type of memory devices. For example, the type of memory in memory devices 640 includes Dynamic Random Access Memory (DRAM), Static Random Access Memory (SRAM), NAND Flash memory, NOR flash memory, Ferroelectric Random Access Memory (FeRAM), or otherwise. Memory devices 640 store at least instructions of an operating system 642, one or more device drivers, and application 644. In some implementations, application 644 is a highly parallel data application such as a video graphics application, a shader application, or other. Copies of these instructions can be stored in a memory or cache device local to processing circuit 610 and/or processing circuit 602.

I/O interfaces 620 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 620. Such peripheral devices include (but are not limited to) displays, keyboards, mice, printers, scanners, joysticks or other types of game controllers, media recording devices, external storage devices, and so forth. Network interface 135 receives and sends network messages across a network.

Figure 7:
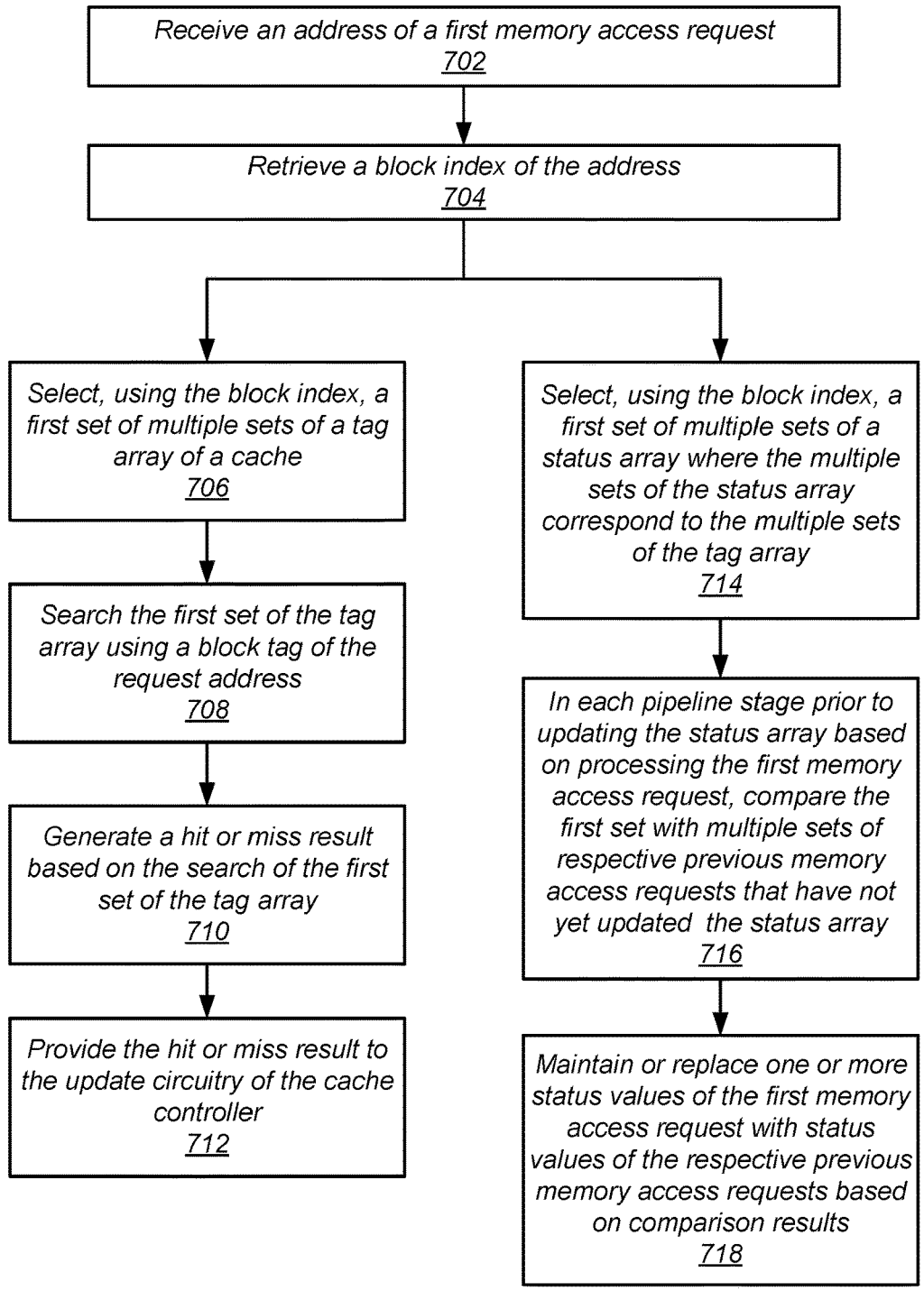
FIG. 7 is a generalized block diagram of a method for efficiently processing cache accesses of an integrated circuit.

Referring to FIG. 7, a generalized block diagram is shown of a method 700 for efficiently processing cache accesses of an integrated circuit. Circuitry of a cache controller receives an address of a first memory access request (block 702). The circuitry retrieves a block index of the address (block 704). The circuitry selects, using the block index, a first set of multiple sets of a tag array of a cache (block 706). The circuitry searches the first set of the tag array using a block tag of the request address (block 708). The circuitry generates a hit or miss result based on the search of the first set of the tag array (block 710). The circuitry provides the hit or miss result to the update circuitry of the cache controller (block 712).

The circuitry selects, using the block index, a first set of multiple sets of a status array where the multiple sets of the status array correspond to the multiple sets of the tag array (block 714). In various implementations, the steps performed in blocks 706 and 714 occur simultaneously. For example, the steps are performed in the same pipeline stage (and the same clock cycle). In each pipeline stage prior to updating the status array based on processing the first memory access request, the circuitry compares the first set with a set of a previous memory access request that has not yet updated the status array (block 716). Based on the comparison results, the circuitry maintains or replaces one or more status values of the first memory access request with status values of the respective previous memory access request (block 718).

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high-level programming language such as C, or a design language (HDL) such as Verilog, VHDL, or database format such as GDS II stream format (GDSII). In some cases, the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware-based type emulator from such vendors as Cadence®, EVER, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An integrated circuit comprising:
   a status array comprising circuitry configured to store status values corresponding to cache lines; and
   circuitry configured to replace one or more status values of a first cache set with one or more status values of a second cache set, responsive to an identification of the first cache set matching an identification of the second cache set.

2. The integrated circuit as recited in claim 1, wherein the first cache set corresponds to a first memory access request and the second cache set corresponds to second memory access request that is older in program order than the first memory access request.

3. The integrated circuit as recited in claim 2, wherein the one or more status values of the first cache set comprise one or more of a: cache replacement policy value, and a count of memory access requests corresponding to the first memory access request that are waiting for a cache fill line.

4. The integrated circuit as recited in claim 1, wherein the each of the first cache set and the second cache set are identified by a block index of a corresponding memory access request.

5. The integrated circuit as recited in claim 1, wherein the circuitry is further configured to update a tag hit or miss status of the one or more status values of the first cache set in a pipeline stage after a pipeline stage the one or more status values of the first cache set are read from the status array.

6. The integrated circuit as recited in claim 5, wherein the circuitry is further configured to generate an updated value of the tag hit or miss status of the one or more status values of the first cache set, responsive to a search of a tag array using a block tag of a memory access request address.

7. The integrated circuit as recited in claim 1, wherein the circuitry is configured to one or more of status values of a first cache set unchanged, responsive to the identification of the first cache set not matching the identification of the second cache set.

8. A method comprising:
storing, by circuitry, status values corresponding to cache lines in a status array; and
replacing one or more status values of a first cache set with one or more status values of a second cache set, responsive to an identification of the first cache set matching an identification of the second cache set.

9. The method as recited in claim 8, wherein the first cache set corresponds to a first memory access request and the second cache set corresponds to second memory access request that is older in program order than the first memory access request.

10. The method as recited in claim 9, wherein the one or more status values of the first cache set comprise one or more of a: cache replacement policy value, and a count of memory access requests corresponding to the first memory access request that are waiting for a cache fill line.

11. The method as recited in claim 9, further comprising leaving the one or more status values of a first cache set unchanged, responsive to the identification of the first cache set not matching the identification of the second cache set.

12. The method as recited in claim 8, wherein the each of the first cache set and the second cache set are identified by a block index of a corresponding memory access request.

13. The method as recited in claim 12, further comprising updating a tag hit or miss status of the one or more status values of the first cache set in a pipeline stage after the one or more status values of the first cache set are read from the status array.

14. The method as recited in claim 13, further comprising generating an updated value of the tag hit or miss status of the one or more status values of the first cache set, responsive to searching a tag array using a block tag of a memory access request address.

15. A computing system comprising:
a tag array comprising circuitry configured to store, arranged as a plurality of sets, a plurality of tag portions of addresses pointing to storage locations of cache lines;
a status array comprising circuitry configured to store, arranged as a plurality of sets, a plurality of status values corresponding to cache lines; and
circuitry configured to:
receive a request address corresponding to a first memory access request;
read, from the status array, status values stored in a first cache set of the plurality of sets identified by the first memory access request;
compare the first cache set with a second cache set identified by a second memory access request; and
replace one or more of the status values stored in the first cache set with one or more of status values of the second cache set, in response to the first cache set matching the second cache set.

16. The computing system as recited in claim 15, wherein the second memory access request is older in program order than the first memory access request.

17. The computing system as recited in claim 16, wherein the status values of the first cache set comprise one or more of: a cache replacement policy value, and a count of memory access requests waiting for a cache fill line addressed by the request address of the first memory access request.

18. The computing system as recited in claim 16, wherein the circuitry is further configured to store the plurality of status values in flip-flop circuits.

19. The computing system as recited in claim 18, wherein the circuitry is further configured to update a tag hit or miss status of the status values of the first cache set in a later pipeline stage after a pipeline stage in which the status values of the first cache set from the status array are read.

20. The computing system as recited in claim 19, wherein the circuitry is further configured to generate an updated value of the tag hit or miss status of the status values of the first cache set in the later pipeline stage, responsive to a search operation of a tag array using a block tag of the request address.

* * * * *